US011235590B2

(12) United States Patent
Ishimi et al.

(10) Patent No.: US 11,235,590 B2
(45) Date of Patent: Feb. 1, 2022

(54) LASER PROCESSING APPARATUS

(71) Applicant: Ricoh Company, Ltd., Tokyo (JP)

(72) Inventors: Tomomi Ishimi, Shizuoka (JP); Kazutaka Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 137 days.

(21) Appl. No.: 16/488,729

(22) PCT Filed: Feb. 27, 2018

(86) PCT No.: PCT/JP2018/007276
§ 371 (c)(1),
(2) Date: Aug. 26, 2019

(87) PCT Pub. No.: WO2018/168446
PCT Pub. Date: Sep. 20, 2018

(65) Prior Publication Data

US 2021/0031540 A1 Feb. 4, 2021

(30) Foreign Application Priority Data

Mar. 15, 2017 (JP) ............................ JP2017-049835

(51) Int. Cl.
*B41J 2/45* (2006.01)
*B41J 2/455* (2006.01)
(Continued)

(52) U.S. Cl.
CPC ............... *B41J 2/455* (2013.01); *B41J 2/451* (2013.01); *B41J 2/46* (2013.01); *B41J 2/47* (2013.01)

(58) Field of Classification Search
CPC ..... B41J 2/451; B41J 2/455; B41J 2/46; B41J 2/4753
See application file for complete search history.

(56) References Cited

U.S. PATENT DOCUMENTS 6,643,049 B2 11/2003 Moulin
8,730,293 B2 5/2014 Yamamoto
(Continued)

FOREIGN PATENT DOCUMENTS

CN 1551998 A 12/2004
CN 102449740 A 5/2012
(Continued)

OTHER PUBLICATIONS

International Search Report and Written Opinion dated Sep. 12, 2018 in PCT/JP2018/007276 filed on Feb. 27, 2018.
(Continued)

*Primary Examiner* — Matthew Luu
*Assistant Examiner* — Kendrick X Liu
(74) *Attorney, Agent, or Firm* — Xsensus LLP

(57) ABSTRACT

According to an embodiment, a laser processing apparatus, that perform laser processing on an object with laser light, includes a plurality of optical heads. The optical heads each includes a laser head unit that emits a plurality of laser light beams in an arranged manner in a predetermined direction, and an optical system that focuses the emitted plurality of laser light beams on the object conveyed relatively with respect to the laser head unit in a conveying direction intersecting the predetermined direction. The optical heads each includes a first optical head group and a second optical head group in which the optical heads are adjacent to each other in the predetermined direction. The first optical head group and the second optical head group are adjacent to each other in the conveying direction and arranged while being shifted from each other by a predetermined length in the predetermined direction.

8 Claims, 4 Drawing Sheets

(51) Int. Cl.

| | |
|---|---|
| ***B41J 2/46*** | (2006.01) |
| ***B41J 2/475*** | (2006.01) |
| ***B41J 2/47*** | (2006.01) |

(56) References Cited

U.S. PATENT DOCUMENTS

| | | | | |
|---|---|---|---|---|
| 8,842,145 | B2 | 9/2014 | Cridland et al. | |
| 8,947,486 | B2 | 2/2015 | Tsuchiya | |
| 9,012,338 | B2 | 4/2015 | Kajiyama et al. | |
| 2002/0101647 | A1 | 8/2002 | Moulin | |
| 2003/0214571 | A1* | 11/2003 | Ishikawa | B23K 26/0604 347/255 |
| 2006/0178254 | A1 | 8/2006 | Takeda et al. | |
| 2006/0268308 | A1 | 11/2006 | Suzuki et al. | |
| 2010/0135683 | A1* | 6/2010 | Arai | G03G 15/04072 399/51 |
| 2012/0077351 | A1 | 3/2012 | Kajiyama et al. | |
| 2012/0194629 | A1 | 8/2012 | Tsuchiya | |
| 2012/0307223 | A1* | 12/2012 | Van Zwet | G03F 7/70275 355/67 |
| 2012/0325099 | A1 | 12/2012 | Miyagawa | |
| 2013/0050389 | A1 | 2/2013 | Cridland et al. | |
| 2013/0135425 | A1 | 5/2013 | Yamamoto | |
| 2016/0279707 | A1* | 9/2016 | Mattes | B29C 64/393 |

FOREIGN PATENT DOCUMENTS

| | | | |
|---|---|---|---|
| CN | 102621849 | A | 8/2012 |
| CN | 102802959 | A | 11/2012 |
| CN | 103129157 | B | 3/2016 |
| JP | 9-156153 | A | 6/1997 |
| JP | 3599064 | | 9/2004 |
| JP | 2005-187323 | | 7/2005 |
| JP | 2006-327042 | | 12/2006 |
| JP | 2010-052350 | | 3/2010 |
| WO | 2005/037932 | | 4/2005 |

OTHER PUBLICATIONS

Combined Chinese Office Action and Search Report dated Jun. 24, 2020 in Chinese Patent Appiication No. 201880017544.5 (with English translation), 15 pages

* cited by examiner

[Fig. 1]
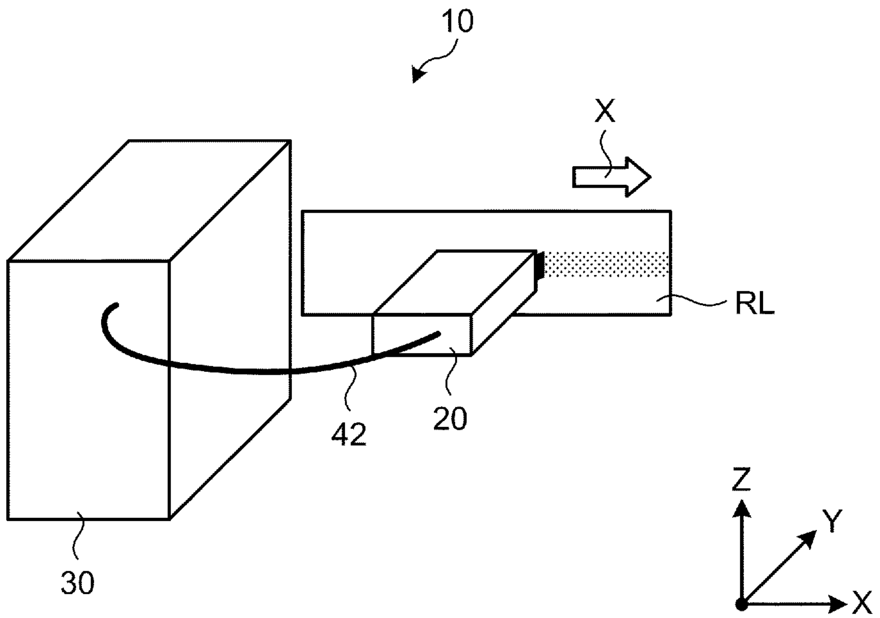

[Fig. 2]
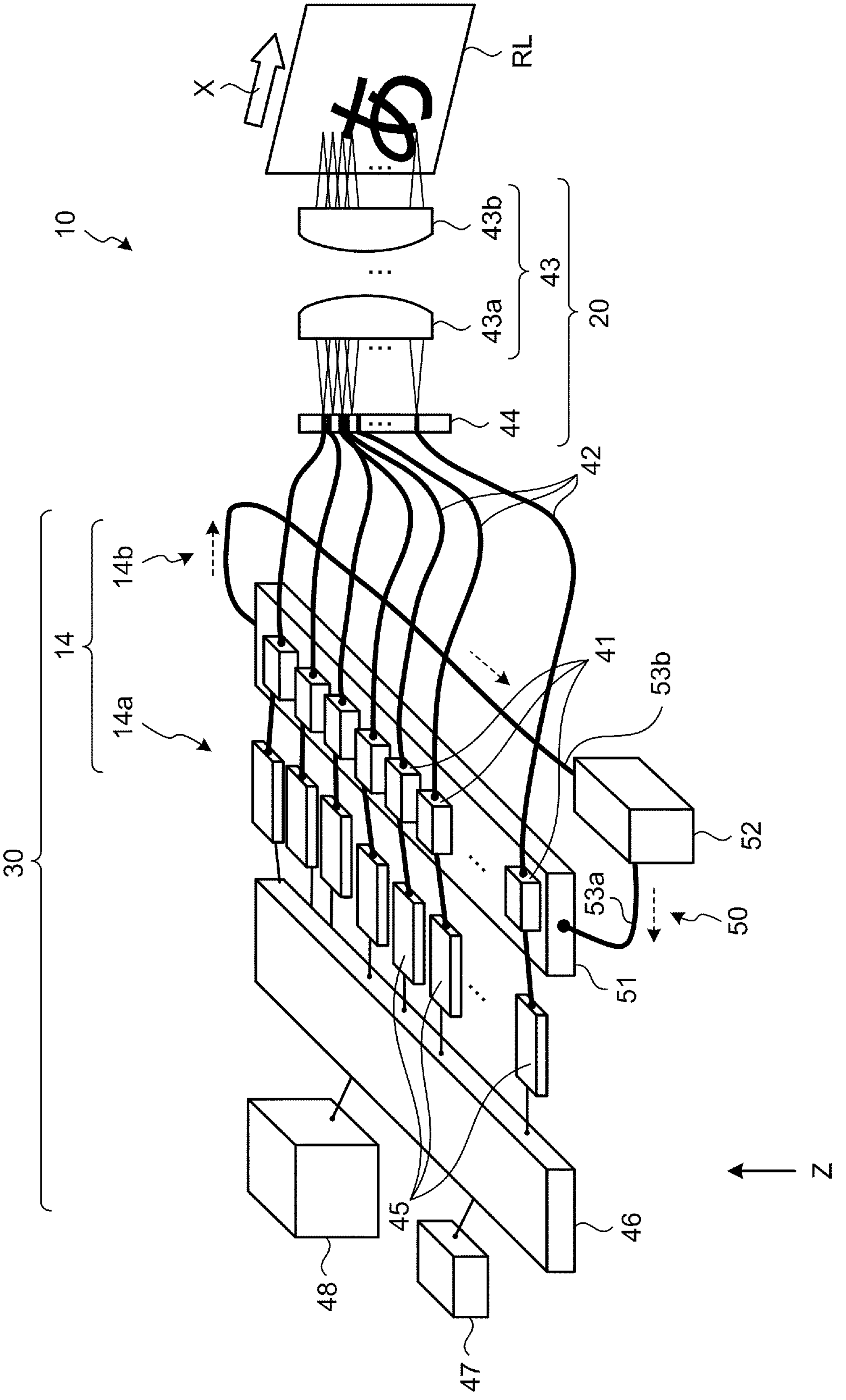

[Fig. 3A]
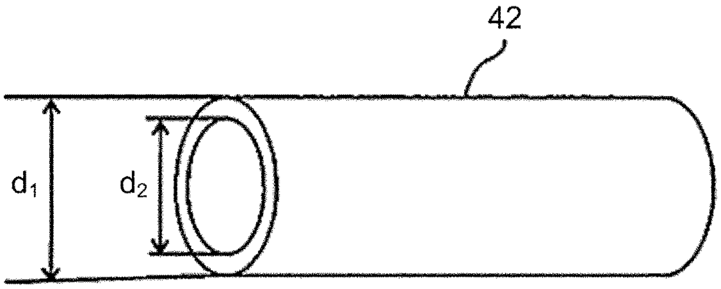
[Fig. 3B]
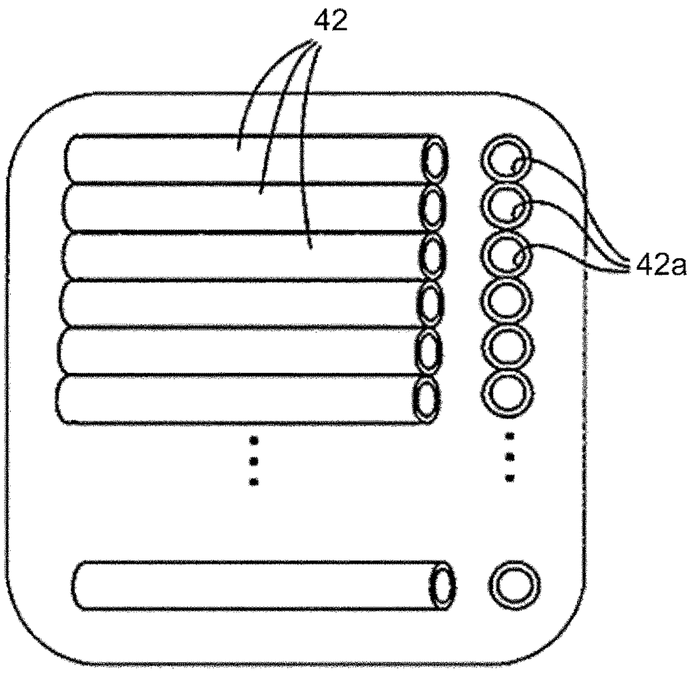
[Fig. 4]
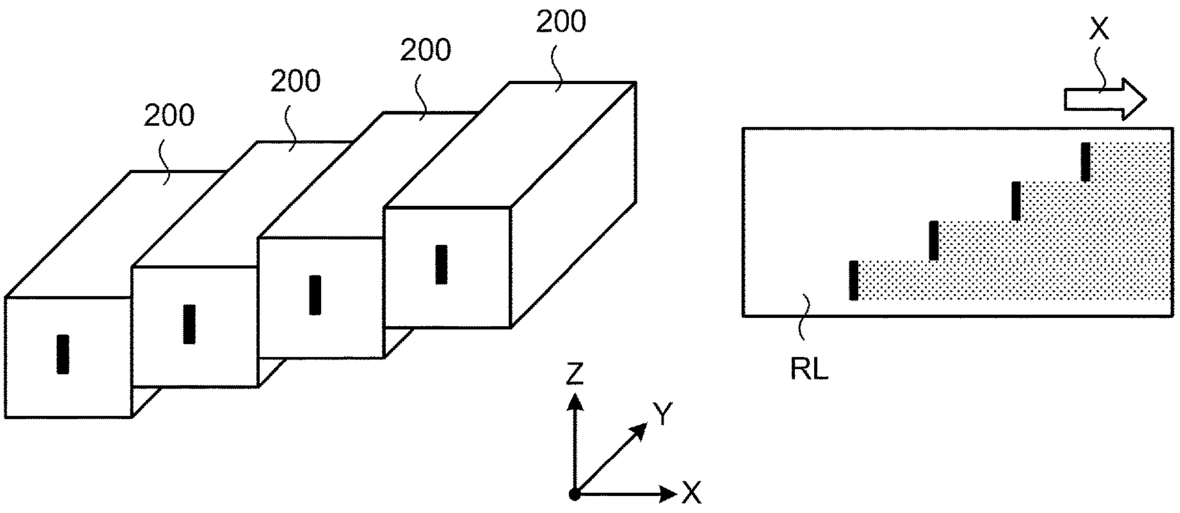

[Fig. 5]
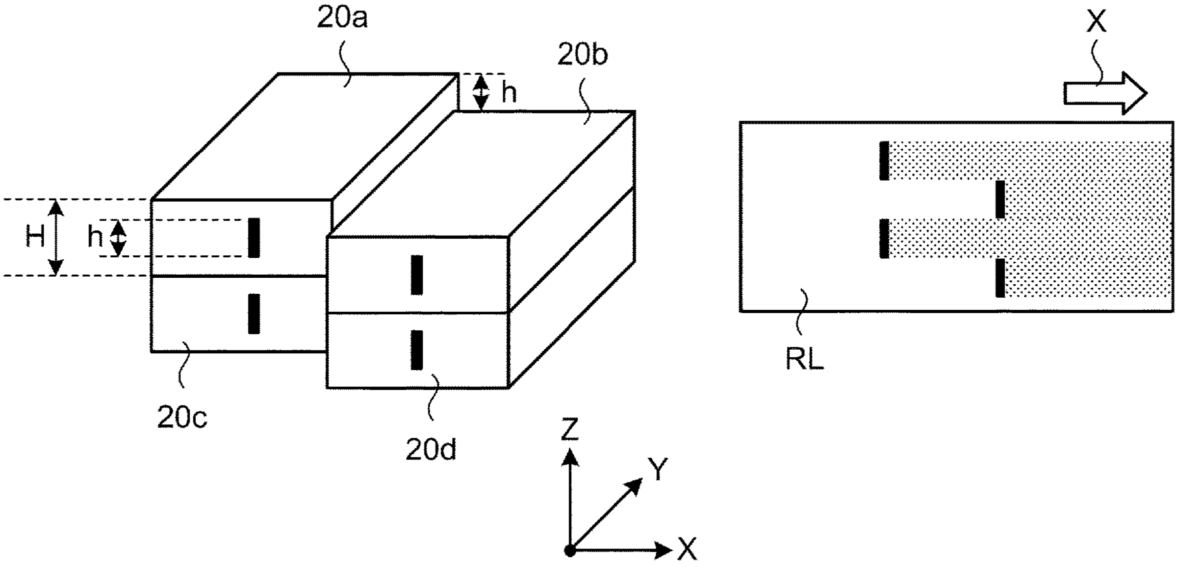
[Fig. 6]
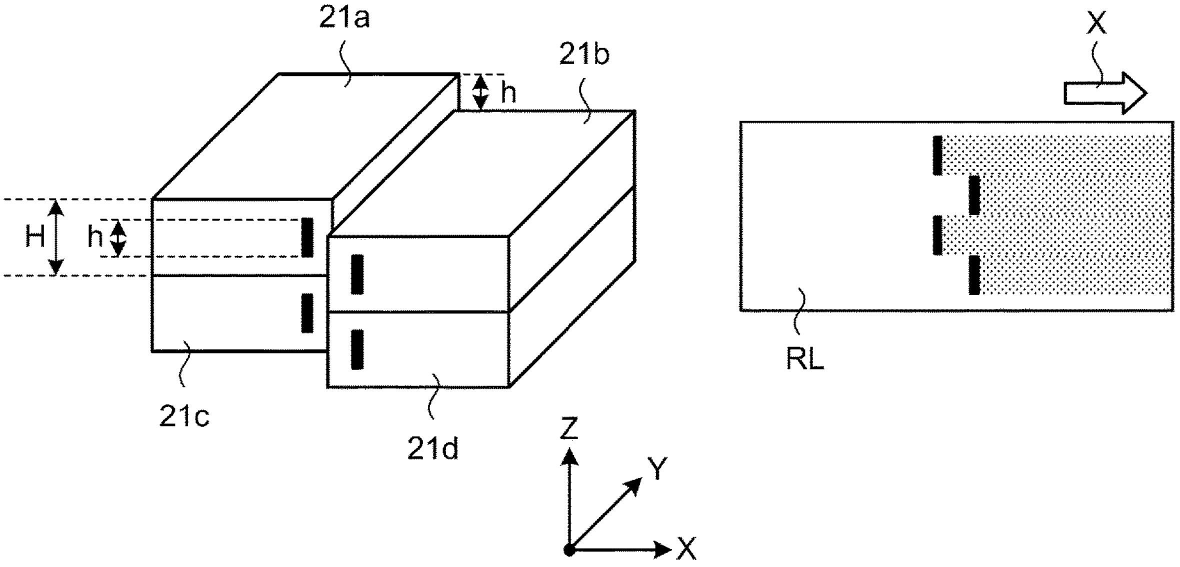

LASER PROCESSING APPARATUS

TECHNICAL FIELD

The present invention relates to a laser processing apparatus.

BACKGROUND ART

Conventionally, there has been known a laser processing apparatus that irradiates an object to be irradiated with laser light to heat the object to be irradiated, thereby performing processing and laser processing of an image and the like on the object to be irradiated with laser light.

For example, there is known an image recording apparatus provided with a laser irradiation device such as a laser array in which a plurality of semiconductor lasers serving as laser light emitting elements is arranged in array and that irradiates different positions from one another in a predetermined direction with laser light emitted from each semiconductor laser (refer to PTL 1). The image recording apparatus of PTL 1 irradiates an object to be subjected to recording and that moves relatively with respect to the laser irradiation device, with laser light in a direction different from the above predetermined direction, thereby recording a visible image on the object on which recording is to be performed.

In the laser processing apparatus, a width in which the laser processing is performed (laser processing width) differs depending on the size of the object to be subjected to the laser processing. It is efficient if one type of laser processing apparatus is capable of coping with various laser processing widths. Meanwhile, there is a problem that in a case where the laser irradiation device in which a plurality of laser light emitting elements is arranged in array irradiates the object to be irradiated with laser light, if a length in a direction in which the laser light emitting elements are arranged increases, an optical system (optical lens) becomes large, and furthermore an optical head provided with the optical system also becomes large.

Therefore, there is proposed a laser processing apparatus capable of coping with different laser processing widths by combining a plurality of optical heads each having a predetermined length. In this laser processing apparatus, since the optical head is larger than laser light in array, a plurality of optical heads cannot be arranged in a straight line. Therefore, the optical heads are arranged while being shifted in a direction different from the direction in which the plurality of laser light emitting elements is arranged (for example, a conveying direction of the object to be subjected to the laser processing). Then, the laser light emitted from each optical head of the laser processing apparatus performs the laser processing at different timing with respect to a direction perpendicular to the conveying direction of the object to be subjected to the laser processing.

SUMMARY OF INVENTION

Technical Problem

Herein, since the laser processing apparatus irradiates the object to be subjected to the laser processing with laser light while moving (conveying) the object to be subjected to the laser processing at a high speed, it is difficult to continue to convey the object to be subjected to the laser processing at a constant speed in a predetermined moving direction. In particular, in a case where the object to be subjected to the laser processing is a thin film or the like, the laser light may meander due to deflection or the like. However, in a case where the object to be irradiated with laser light cannot be conveyed at the constant speed in the predetermined moving direction, a processing deviation occurs in laser processing at each optical head. This processing deviation increases as a distance in the moving direction of the object to be subjected to the laser processing increases.

In view of the above problems, there is a need to suppress the processing deviation and perform good laser processing in a case where laser processing is performed on an object to be subjected to the laser processing by a plurality of optical heads.

Solution to Problem

According to an embodiment, there is provided a laser processing apparatus that irradiates an object to be subjected to the laser processing with laser light to perform laser processing. The laser processing apparatus includes a plurality of optical heads. The Plurality of optical heads includes a laser head unit and an optical system. The laser head unit emits a plurality of laser light beams in an arranged manner in a predetermined direction. The optical system that focuses the emitted plurality of laser light beams on the object to be subjected to the laser processing that is conveyed relatively with respect to the laser head unit in a conveying direction intersecting the predetermined direction. The plurality of optical heads includes a first optical head group and a second optical head group. The optical heads are adjacent to each other in the predetermined direction. The first optical head group and the second optical head group are adjacent to each other in the conveying direction and arranged while being shifted from each other by a predetermined length in the predetermined direction.

Advantageous Effects of Invention

According to the present invention, in a case where laser processing is performed on an object to be subjected to the laser processing by a plurality of optical heads, an effect that a processing deviation can be suppressed and good laser processing can be performed is obtained.

BRIEF DESCRIPTION OF DRAWINGS

FIG. 1 is a configuration diagram of a laser processing apparatus according to an embodiment.

FIG. 2 is a schematic diagram illustrating a configuration of the laser processing apparatus.

FIG. 3A is an enlarged schematic view of an optical fiber.

FIG. 3B is an enlarged view of near an array head.

FIG. 4 is a descriptive diagram of a conventional laser processing apparatus in which a plurality of optical heads is arranged.

FIG. 5 is a descriptive diagram of a laser processing apparatus according to a first embodiment.

FIG. 6 is a descriptive diagram of a laser processing apparatus according to a second embodiment. The accompanying drawings are intended to depict exemplary embodiments of the present invention and should not be interpreted to limit the scope thereof. Identical or similar reference numerals designate identical or similar components throughout the various drawings.

DESCRIPTION OF EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, an embodiment of a laser processing apparatus to which the present invention is applied will be described. The laser processing apparatus irradiates an object to be subjected to laser processing with laser light to perform surface processing on the object to be subjected to the laser processing and to perform laser processing that forms and records an image on the object to be subjected to the laser processing.

The surface processing is processing that deforms and alters the surface of the object. The image is not particularly limited and can be appropriately selected according to a purpose as long as the image is visible information. Examples of the image includes a character, a symbol, a line, a figure, a solid image, a combination thereof, a bar code, and a two-dimensional code such as a QR code (registered trademark).

Furthermore, the object to be subjected to the laser processing is not particularly limited and can be appropriately selected according to a purpose as long as the recording processing and the processing by laser can be performed on the object to be subjected to the laser processing. The object to be subjected to the laser processing on which the image is recorded may be anything as long as the object absorbs light and converts the light into heat to form an image, and the object to be subjected to the laser processing includes, for example, a marking on a metal. Furthermore, examples of the object to be subjected to the laser processing include a thermosensitive recording medium and a structure including a thermosensitive recording unit.

The thermosensitive recording medium includes a support and an image recording layer on the support, and further includes other layers as necessary. Each of these layers may have a single-layer structure or a stacked structure or may be provided on the other face of the support.

Image Recording Layer

The image recording layer is formed by containing a leuco dye and a developer, and further contains other components as necessary.

The leuco dye is not particularly limited and can be appropriately selected from among those usually used for thermosensitive recording materials according to a purpose. For example, as the leuco dye, a leuco compound of a dye such as a triphenylmethane dye, a fluoran dye, a phenothiazine dye, an auramine dye, a spiropyran dye, and an indolinophthalide dye is preferably used.

As the developer, various electron-accepting compounds, oxidizing agents, and the like that are capable of coloring the leuco dye at the time of contact can be applied.

Examples of the other components include a binder resin, a photothermal conversion material, a heat fusible substance, an antioxidant, a light stabilizer, a surfactant, a lubricant, and a filler.

Support

The shape, structure, size, and the like of the support are not particularly limited and can be appropriately selected according to a purpose. Examples of the shape include a flat plate shape. The structure may be a single layer structure or a stacked structure. The size can be appropriately selected according to the size of the thermosensitive recording medium and the like.

Other Layers

Examples of the other layers include a photothermal conversion layer, a protective layer, an under layer, an ultraviolet absorbing layer, an oxygen blocking layer, an intermediate layer, a back layer, an adhesive layer, and a pressure sensitive adhesive layer.

The thermosensitive recording medium can be processed into a desired shape according to the use of the thermosensitive recording medium. Examples of the shape include a card shape, a tag shape, a label shape, a sheet shape, and a roll shape.

Examples of a thermosensitive recording medium processed in a card shape include a prepaid card, a point card, and a credit card. The thermosensitive recording medium having a tag shape and size smaller than a size of the thermosensitive recording medium having a card shape can be used for a price tag and the like. Furthermore, the thermosensitive recording medium having a tag shape and size larger than a card shape size can be used for process management, a shipping instruction document, a ticket, and the like. The thermosensitive recording medium having a label shape can be attached. Therefore, the thermosensitive recording medium is processed to various sizes, can be attached to a trolley, a case, a box, a container, and the like that are repeatedly used, and used for process management, article management, and the like. Furthermore, in the thermosensitive recording medium having a sheet shape and size larger than the card size, an image recording range becomes wide. Therefore, the thermosensitive recording medium can be used for a general document, an instruction document for process management, and the like.

Examples of the thermosensitive recording unit included in the structure includes a portion where a label shape thermosensitive recording medium is attached to the surface of the structure and a portion where the surface of the structure is coated with the thermosensitive recording material. Furthermore, the structure including the thermosensitive recording unit is not particularly limited as long as the structure has a thermosensitive recording unit on the surface of the structure and can be appropriately selected according to a purpose. Examples include various kinds of products such as a plastic bag, a polyethylene terephthalate (PET) bottle, a canned product, a transport case such as a cardboard and a container, a product in progress, and an industrial product.

Hereinafter, as an example, there will be described a laser processing apparatus and a laser processing system that records an image by moving, by roll rotation, the structure including the thermosensitive recording unit as the object to be subjected to the laser processing, specifically the thermosensitive recording medium (object to be subjected to the laser processing) wound around a roll.

FIG. 1 is a configuration diagram of a laser processing apparatus according to an embodiment. As illustrated in FIG. 1, in the following description, description will be given while taking the conveying direction of a thermosensitive recording medium RL as an X-axis direction, a vertical direction as a Z-axis direction, and a direction orthogonal to both the conveying direction and the vertical direction as a Y-axis direction.

As will be described in detail below, the laser processing apparatus 10 according to the present embodiment irradiates, with laser light, a thermosensitive recording medium RL that is an object to be subjected to laser processing and performs surface processing and image recording processing. The laser processing apparatus 10 includes a conveyance means that conveys the thermosensitive recording medium RL, an optical head 20 that emits the laser light, a main unit 30 that controls the optical head 20, an optical fiber 42 that connects the optical head 20 and the main unit 30, and a system control device. The laser processing apparatus 10 irradiates the object to be subjected to the laser processing with the laser light from the optical head 20 to perform the processing and record a visible image on the surface of the object to be subjected to the laser processing.

Herein, the thermosensitive recording medium RL that is an example of the object to be subjected to the laser processing will be described.

The thermosensitive recording medium RL is, for example, a medium that has a support such as paper or a film and has a thermosensitive recording layer that thermally develops colors on the support, and the image is recorded by changes in color tone due to heat. In the present embodiment, the medium that performs image recording once is used as the thermosensitive recording medium RL, but a thermoreversible recording medium capable of recording a plurality of number of times can also be used.

The thermosensitive recording medium RL used in the present embodiment uses a thermosensitive recording medium including a material (photothermal conversion material) that absorbs the laser light and converts the laser light into heat and a material that causes changes in hue, reflectance, and the like due to heat.

The photothermal conversion material can be roughly divided into an inorganic material and an organic material. Examples of the inorganic material include particles of at least any of carbon black, a metal boride, and a metal oxide such as Ge, Bi, In, Te, Se, and Cr. As the inorganic material, a material having large light absorption in a near-infrared wavelength region and small light absorption in a visible range wavelength region is preferable, and a metal boride and a metal oxide are preferable. The inorganic material is preferably at least one type selected from hexaboride, a tungsten oxide compound, antimony tin oxide (ATO), indium tin oxide (ITO), and zinc antimonate.

Examples of the hexaboride include $LaB_6$, $CeB_6$, $PrB_6$, $NdB_6$, $GdB_6$, $TbB_6$, $DyB_6$, $HoB_6$, $YB_6$, $SmB_6$, $EuB_6$, $ErB_6$, $TmB_6$, $YbB_6$, $LuB_6$, $SrB_6$, $CaB_6$, and $(La, Ce)B_6$.

Examples of the tungsten oxide compound includes fine particles of a tungsten oxide represented by a general formula as described in International Laid-open Patent Publication No. WO2005/037932 and Japanese Laid-Open Patent Publication No. 2005-187323: WyOz (here, W is tungsten, O is oxygen, and $2.2 \leq z/y \leq 2.999$) or fine particles of a composite tungsten oxide represented by a general formula: MxWyOz (here, M is one or more elements selected from H, He, an alkali metal, an alkali earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, $0.001 \leq x/y \leq 1$, and $2.2 \leq z/y \leq 3.0$). Among these tungsten oxide compounds, cesium-containing tungsten oxide is particularly preferable as the tungsten oxide compound, since absorption in the near-infrared region is large and absorption in the visible region is small.

Furthermore, among antimony tin oxide (ATO), indium tin oxide (ITO), and zinc antimonate, ITO is particularly preferable as the tungsten oxide compound from a viewpoint that absorption in a near-infrared region is large and absorption in a visible region is small. These are formed in a layer by vacuum vapor deposition or by adhering particulate materials with resin or the like.

As the organic material, various kinds of dyes can be appropriately used according to the wavelength of light to be absorbed. In a case where a semiconductor laser is used as a light source, a near infrared absorption dye having an absorption peak near 600 nm to 1,200 nm is used. Specifically, a cyanine dye, a quinone dye, a quinoline derivative of indonaphthol, a phenylenediamine nickel complex, a phthalocyanine dye, and the like can be mentioned.

One type of the photothermal conversion material may be used alone, or two or more types of the photothermal conversion materials may be used in combination. Furthermore, the photothermal conversion material may be provided in the image recording layer or may be provided somewhere other than the image recording layer. In the case where the photothermal conversion material is used for a thing other than the image recording layer, it is preferable to provide a photothermal conversion layer adjacent to a thermoreversible recording layer. The photothermal conversion layer is formed by containing at least the photothermal conversion material and the binder resin.

As a material that causes changes in hue, reflectance, and the like due to heat, known materials such as a combination of an electron-donating dye precursor and an electron-accepting color developing agent used for conventional thermal paper can be used. Furthermore, as a reaction causes a material to change in hue, reflectance, and the like, a complex reaction of heat and light and a discoloration reaction accompanying solid phase polymerization, for example, by heating a diacetylene compound and emitting ultraviolet light are included.

Next, the details of the laser processing apparatus 10 will be described. FIG. 2 is a schematic diagram illustrating a configuration of the laser processing apparatus 10.

In the laser processing apparatus 10 according to the present embodiment, the surface processing and the image recording are performed by using a fiber array where the laser emitting units of a plurality of optical fibers is arranged in array in a main scanning direction (Z-axis direction) orthogonal to a sub-scanning direction (X-axis direction) that is a moving direction of the thermosensitive recording medium RL. Hereinafter, the image recording by the laser processing apparatus 10 will be described while taking an example.

The laser processing apparatus 10 controls emission of laser light from laser light emitting elements 41, thereby recording a visible image including drawing units through the laser processing in which the thermosensitive recording medium RL is irradiated with the laser light. Specifically, the laser processing apparatus 10 includes a laser irradiation device 14 including a laser array unit 14*a* and a fiber array unit 14*b* and an optical unit 43.

The laser array unit 14*a* includes a plurality of laser light emitting elements 41 arranged in array, a cooling unit 50 that cools the laser light emitting elements 41, a plurality of drive drivers 45 provided while corresponding to the laser light emitting elements 41 and for driving the corresponding laser light emitting elements 41, and a controller 46 that controls the plurality of drive drivers 45. A power source 48 that supplies power to the laser light emitting elements 41 and an image information output unit 47 such as a personal computer that outputs image information are connected to the controller 46.

The laser light emitting elements 41 can be appropriately selected according to a purpose, and for example, a semiconductor laser, a solid laser, and a dye laser can be used.

Among these lasers, the semiconductor laser is preferable as the laser light emitting elements 41, in that the semiconductor laser has wide wavelength selectivity and that since the semiconductor laser is small, enabling the miniaturization and cost reduction of the apparatus.

Furthermore, the wavelength of the laser light emitted from the laser light emitting elements 41 is not particularly limited and can be appropriately selected according to a purpose, but is preferably 700 nm to 2000 nm, more preferably 780 nm to 1600 nm.

In the laser light emitting elements 41 as an emitting means, all energy to be applied is not converted into laser light, and usually energy that is not converted into laser light is converted into heat. As a result, heat is produced. Therefore, the laser light emitting elements 41 are cooled by the cooling unit 50 that is a cooling means.

Furthermore, in the laser irradiation device 14, the fiber array unit 14*b* is used. As a result, the laser light emitting elements 41 can be arranged away from one another. This makes it possible to reduce the influence of heat from the adjacent laser light emitting elements 41 and to efficiently cool the laser light emitting elements 41. For this reason, it is possible to avoid a temperature rise of the laser light emitting elements 41, to reduce fluctuation in the output of the laser light, and to improve density unevenness and white spots.

Note that the output of the laser light is average output measured by a power meter.

There are two methods of controlling the output of the laser light, that is, a method of controlling peak power and a method of controlling the issue ratio of pulses (duty:laser emission time/cycle time).

The cooling unit 50 is of a liquid cooling type in which cooling liquid is circulated to cool the laser light emitting elements 41 and includes a heat receiving unit 51 in which the cooling liquid receives heat from each laser light emitting element 41 and a heat radiating unit 52 from which heat of the cooling liquid is radiated. The heat receiving unit 51 and the heat radiating unit 52 are connected by cooling pipes 53*a* and 53*b*.

The heat receiving unit 51 is provided with a cooling pipe that is formed of a good heat conductive member and allows the cooling liquid to flow in a case formed of a good heat conductive member. The plurality of laser light emitting elements 41 is arranged in array on the heat receiving unit 51.

The heat radiating unit 52 includes a radiator and a pump for circulating the cooling liquid. The cooling liquid sent out by the pump of the heat radiating unit 52 passes through the cooling pipe 53*a* and flows into the heat receiving unit 51. Then, the cooling liquid deprives the laser light emitting elements 41 arrayed in the heat receiving unit 51 of the heat while moving in a cooling pipe in the heat receiving unit 51 and cools the laser light emitting element 41. The cooling liquid, which has flowed out from the heat receiving unit 51, deprived the laser light emitting elements 41 of heat, and risen in temperature, moves in the cooling pipe 53*b* and flows into the radiator of the heat radiating unit 52 and is cooled by the radiator. The cooling liquid cooled by the radiator is sent again to the heat receiving unit 51 by the pump.

The fiber array unit 14*b* includes a plurality of optical fibers 42 provided while corresponding to the laser light emitting elements 41 and an array head 44 that holds near laser emitting units 42*a* (refer to FIG. 3B) of these optical fibers 42 in array in the vertical direction (Z-axis direction). A laser incident unit of each optical fiber 42 is attached to the laser emitting surface of the corresponding laser light emitting element 41. The array head 44 is an example of the optical head 20. Furthermore, the Z-axis direction is an example of a predetermined direction, and the predetermined direction that is the Z-axis direction is orthogonal to the conveying direction that is the X-axis direction.

FIG. 3A is an enlarged schematic view of the optical fiber. FIG. 3B is an enlarged view of near the array head.

The optical fiber 42 is an optical waveguide of the laser light emitted from the laser light emitting element 41. The shape, size (diameter), material, structure, and the like of the optical fiber 42 are not particularly limited and can be appropriately selected according to a purpose.

The size (diameter $d_1$) of the optical fiber 42 is preferably 15 μm or more and 1000 μm or less. When the diameter $d_1$ of the optical fiber 42 is 15 μm or more and 1000 μm or less, this configuration is advantageous in terms of image definition. In the present embodiment, an optical fiber having a diameter of 125 μm is used.

Furthermore, the material of the optical fiber 42 is not particularly limited and can be appropriately selected according to a purpose, and examples of the material include glass, resin, and quartz.

As the structure of the optical fiber 42, a structure including a core portion at the center through which the laser light passes and a cladding layer provided on the outer periphery of the core portion is preferable.

The diameter $d_2$ of the core portion is not particularly limited and can be appropriately selected according to a purpose, but it is preferably 10 μm or more and 500 μm or less. In the present embodiment, an optical fiber having a core portion diameter $d_2$ of 105 μm is used. Furthermore, the material of the core portion is not particularly limited and can be appropriately selected according to a purpose, and examples of the material include germanium and phosphorus doped glass.

The average thickness of the cladding layer is not particularly limited and can be appropriately selected according to a purpose, but it is preferably 10 μm or more and 250 μm or less. The material of the cladding layer is not particularly limited and can be appropriately selected according to a purpose, and examples of the material include glass doped with boron or fluorine.

As illustrated in FIG. 3B, the array head 44 holds near the laser emitting units 42*a* of the plurality of optical fibers 42 in array such that a pitch of the laser emitting unit 42*a* of each optical fiber 42 is 127 μm. The pitch of the laser emitting unit 42*a* is set to 127 μm so that an image with a resolution of 200 dpi can be recorded.

In a case where all the optical fibers 42 are to be held by one array head 44, the array head 44 becomes elongated and becomes easy to deform. As a result, with one array head 44, it is difficult to maintain the linearity of a beam array and uniformity of a beam pitch. For this reason, the array head 44 holds 100 to 200 optical fibers 42. In addition, in the laser irradiation device 14, a plurality of array heads 44 holding 100 to 200 optical fibers 42 is preferably arranged at a predetermined position in the Z-axis direction that is a direction orthogonal to the conveying direction of the thermosensitive recording medium RL. In the present embodiment, 200 array heads 44 are arranged at predetermined positions in the Z-axis direction.

Furthermore, as illustrated in FIG. 2, the optical unit 43, which is an example of the optical system, includes a collimator lens 43*a* that converts the laser light of a divergent light bundle emitted from each optical fiber 42 into a parallel light bundle, and a condenser lens 43*b* that focuses the laser light on the surface of the thermosensitive recording medium RL that is a laser irradiation surface. Furthermore, whether to provide the optical unit 43 may be appropriately selected depending on a purpose.

The image information output unit 47 of a personal computer or the like inputs image data to the controller 46. The controller 46 generates a drive signal for driving each drive driver 45 on the basis of the input image data and transmits the generated drive signal to each drive driver 45. Specifically, the controller 46 includes a clock generator. When the number of clocks oscillated by the clock generator reaches a specified number of clocks, the controller 46 transmits a drive signal for driving each drive driver 45 to each drive driver 45.

When each drive driver 45 receives the drive signal, the drive driver 45 drives the corresponding laser light emitting element 41. The laser light emitting element 41 emits the laser light according to the drive signal of the drive driver 45. The laser light emitted from the laser light emitting elements 41 is incident on the corresponding optical fiber 42 and is emitted from the laser emitting unit 42*a* of the optical fiber 42. The laser light emitted from the laser emitting unit 42*a* of the optical fiber 42 permeates the collimator lens 43*a* and the condenser lens 43*b* of the optical unit 43 and is then emitted to the surface of the thermosensitive recording medium RL. Then, the thermosensitive recording medium RL is heated by the laser light emitted to the surface of the thermosensitive recording medium RL, and an image is recorded on the surface of the thermosensitive recording medium RL.

In the case of using a device that deflects a laser using a galvanometer mirror to record an image on the thermosensitive recording medium RL, as the laser irradiation device 14, an image such as a character is recorded by emitting the laser light in such a way as to draw the image unicursally. Therefore, in a case where a certain amount of information is to be recorded on the thermosensitive recording medium RL, there is a problem that recording cannot be performed in time unless conveyance of the thermosensitive recording medium RL is stopped.

Meanwhile, a laser array in which a plurality of laser light emitting elements 41 is arranged in array like the laser irradiation device 14 according to the present embodiment is used. As a result, an image can be recorded on the thermosensitive recording medium RL by controlling turning on/off the semiconductor laser corresponding to each pixel. As a result, even if the amount of information is large, the image can be recorded without stopping the conveyance of the thermosensitive recording medium RL. Therefore, even in a case where much information is recorded on the thermosensitive recording medium RL, the image can be recorded without degrading productivity.

As will be described later, the laser irradiation device 14 according to the present embodiment emits the laser light to heat the thermosensitive recording medium RL, thereby recording an image on the thermosensitive recording medium RL. Therefore, it is necessary to use the laser light emitting element 41 capable of a certain degree of high output. Therefore, the amount of heat generated by the laser light emitting element 41 is large.

In a conventional laser irradiation device without the fiber array unit 14*b*, it is necessary to arrange the laser light emitting elements 41 in array at intervals corresponding to the resolution. Therefore, in the conventional laser irradiation device, in order to obtain a resolution of 200 dpi, the laser light emitting elements 41 are arranged at a very narrow pitch. As a result, the heat of the laser light emitting element 41 hardly escapes, and the laser light emitting element 41 becomes high temperature. When the temperature of the laser light emitting element 41 becomes high, the wavelength and light output of the laser light emitting element 41 fluctuate, the thermosensitive recording medium RL cannot be heated to a prescribed temperature, and a good image cannot be obtained.

Furthermore, in the conventional laser irradiation device, in order to suppress a temperature rise of such a laser light emitting element 41, it is necessary to decrease the conveying speed of the thermosensitive recording medium RL to increase a light emission interval of the laser light emitting element 41, and productivity cannot be increased sufficiently.

Usually, the cooling unit 50 uses a chiller method in many cases, and only the cooling is performed without performing heating in this method. Therefore, the temperature of the light source does not become higher than a set temperature of the chiller, but the temperature of the laser light emitting element 41, which is the laser light source in contact with the cooling unit 50, varies according to ambient temperature.

Meanwhile, in a case where a semiconductor laser is used as the laser light emitting element 41, a phenomenon in which the output of the laser light changes according to the temperature of the laser light emitting element 41 occurs (when the temperature of the laser light emitting element 41 becomes low, the output of the laser light increases). Therefore, to control the output of the laser light, it is preferable that the temperature of the laser light emitting element 41 or the temperature of the cooling unit 50 is measured, and an input signal that controls the output of the laser light to the drive driver 45 so as to make the output of the laser light constant according to a result of the measurement is controlled, whereby a normal image is formed.

To cope with this, the laser irradiation device 14 according to the present embodiment is a fiber array laser processing apparatus using the fiber array unit 14*b*. By using the fiber array laser processing apparatus, the laser emitting unit 42*a* of the fiber array may be arranged at a pitch according to the resolution, and there is no need to adjust the pitch between the laser light emitting elements 41 of the laser array unit 14*a* so as to be a pitch corresponding to the image resolution.

Thus, according to the laser irradiation device 14 according to the present embodiment, it is possible to sufficiently widen the pitch between the laser light emitting elements 41 so that the heat of the laser light emitting element 41 can be sufficiently released. As a result, it is possible to suppress the high temperature of the laser light emitting element 41, and it is possible to suppress the fluctuation of the wavelength of the laser light emitting element 41 and the output of the laser light. As a result, according to the laser irradiation device 14 according to the present embodiment, it is possible to record a good image on the thermosensitive recording medium RL. Furthermore, even if the beam emission interval of the laser light emitting element 41 is shortened, since the temperature rise of the laser light emitting element 41 can be suppressed, productivity can be increased by increasing the conveying speed of the thermosensitive recording medium RL.

Furthermore, in the laser irradiation device 14 according to the present embodiment, the cooling unit 50 is provided and the laser light emitting element 41 is cooled by liquid, whereby the temperature rise of the laser light emitting element 41 can be further suppressed. As a result, it is possible to further shorten the beam emission interval of the laser light emitting element 41 to increase the conveying speed of the thermosensitive recording medium RL, thereby enhancing the productivity.

In the laser irradiation device 14 according to the present embodiment, the laser light emitting element 41 is cooled by liquid, but the laser light emitting element 41 may be cooled by air by using a cooling fan or the like. The liquid cooling has a higher cooling efficiency, and there is an advantage that the laser light emitting element 41 can be favorably cooled. Meanwhile, the air cooling reduces the cooling efficiency, but has an advantage that the laser light emitting element 41 can be cooled at low costs.

In the laser processing apparatus 10 according to the present embodiment, the optical head 20 illustrated in FIG. 1 includes the array head 44 and the optical unit 43. Furthermore, the main unit 30 illustrated in FIG. 1 includes the laser irradiation device 14 and the power source 48.

Herein, the object to be subjected to the laser processing (thermosensitive recording medium RL) has various sizes. However, a laser-processable width (laser processing width) with respect to the Z-axis direction (direction perpendicular to the conveying direction (X-axis direction) of the object to be irradiated with laser light) depends on the laser processing apparatus 10. Increasing the number of laser light emitting elements 41 of the laser processing apparatus 10 to widen the laser processing width causes a problem that the optical unit 43 (optical lens system) becomes larger and the optical head 20 becomes larger. Furthermore, if a model that corresponds to various laser processing widths, is owned, new problems on inventory and product costs arise.

To cope with this, there is a laser processing apparatus capable of widening the laser processing width in the Z-axis direction by arranging a plurality of optical heads 20. However, since the Z-axis directional width of the optical head 20 that emits the laser light is larger than the Z-axis directional width of the laser light to be emitted, each optical head 20 is arranged while being shifted in the X-axis direction. For this reason, the laser light emitted from each optical head 20 performs the laser processing with respect to the Z-axis direction at different timings. Thus, if the thermosensitive recording medium RL cannot be accurately conveyed in the conveying direction (X-axis direction), a processing deviation occurs in the laser processing by the laser light emitted from each optical head 20. As a distance in the X-axis direction of the laser light emitted from the optical head 20 increases, this processing deviation increases.

(Comparative Mode)

FIG. 4 is a descriptive diagram of a conventional laser processing apparatus in which a plurality of optical heads is arranged. FIG. 4 is a view illustrating only the optical heads of the laser processing apparatus for the purpose of description.

Since the optical head includes an optical lens, a laser array, and the like, there is a limit to miniaturization. Therefore, as illustrated in FIG. 4, when the plurality of optical heads 200 is used to widen a laser processing width in a Z-axis direction (vertical direction), laser light separates in a movement direction of a thermosensitive recording medium RL.

In a case where the thermosensitive recording medium RL is conveyed at a high speed, it is difficult to convey the thermosensitive recording medium RL at a constant speed in a predetermined moving direction. In particular, for example, in a case where the thermosensitive recording medium RL is a thin film, meandering may occur due to deflection or the like. In such a case, as a distance in an X-axis direction (conveying direction of the thermosensitive recording medium RL) of the laser light emitted from the optical head 200 increases, the deviation of the processing timing increases. Therefore, even if unevenness or omission does not occur in the processing, image formation, and the like that are processed by laser light in array emitted from each optical head 200, unevenness, omission, or the like occurs in processing among the optical heads 200, and it is not possible to perform good laser processing.

First Embodiment

To cope with this, a laser processing apparatus of a first embodiment will be described. FIG. 5 is a descriptive diagram of the laser processing apparatus according to the first embodiment.

As described above, an optical head 20 of the laser processing apparatus 10 according to the present embodiment includes an array head 44 (laser head unit) that emits a plurality of laser light beams in an arranged manner in a Z-axis direction (predetermined direction), and an optical unit 43 that focuses the emitted plurality of laser light beams on a thermosensitive recording medium RL that is conveyed relatively with respect to the array head 44 in an X-axis direction (conveying direction of the thermosensitive recording medium RL) orthogonal to the Z-axis direction (refer to FIG. 2).

As illustrated in FIG. 5, the laser processing apparatus 10 according to the first embodiment includes a plurality of optical heads 20 (20*a* to 20*d*). In the plurality of optical heads 20, a height H that is a length in the Z-axis direction is equal to or less than twice a length h of the laser light emitted from the plurality of optical heads 20 in the Z-axis direction. That is, $H \leq 2h$.

The plurality of optical heads 20*a* to 20*d* includes a first optical head group including the optical head 20*a* and the optical head 20*c* that are optical heads arranged adjacent to each other in the Z-axis direction and a second optical head group including the optical head 20*b* and the optical head 20*d* that are optical heads arranged adjacent to each other in the Z-axis direction. The first optical head group and the second optical head group are arranged adjacent to each other in the X-axis direction (conveying direction of the thermosensitive recording medium RL).

Furthermore, the first optical head group and the second optical head group are arranged while being shifted by a predetermined distance in the Z-axis direction, that is, lowered by the predetermined distance in the Z-axis direction. In the laser processing apparatus 10 according to the present embodiment, the predetermined interval is a length h of the laser light in the Z-axis direction. Therefore, the first optical head group and the second optical head group are arranged so as to be shifted by the length h of the laser light in the Z-axis direction.

Furthermore, as illustrated in FIG. 5, there is illustrated an example in which in the plurality of optical heads 20 of the first embodiment, the array heads 44 are arranged near a central portion in the Z-axis direction and near a central portion of the X-axis direction.

The plurality of optical heads 20*a* to 20*d* is arranged in order of the optical heads 20*a*, 20*b*, 20*c* and 20*d* from above in the Z-axis direction illustrated in FIG. 5. Therefore, in other words, in a case where the plurality of optical heads 20*a* to 20*d* is counted in order from the top in the Z-axis direction, the odd-numbered optical heads 20*a* and 20*c* and the even-numbered optical heads 20*b* and 20*d* are laminated and arranged in a vertical direction that is the Z-axis direction. Then, the respective optical heads are arranged in contact with each other in the X-axis direction.

From the above, referring to the graph of FIG. 5, compared with the graph of FIG. 4, a distance between the laser light of the first optical head group (odd-numbered optical heads 20*a* and 20*c*) and the laser light of the second optical head group (even-numbered optical heads 20*b* and 20*d*) in the X-axis directional is smaller. Thus, in the laser processing apparatus 10 according to the present embodiment, it is possible to narrow the distance between the laser light beams of the plurality of optical heads 20 in the X-axis direction. As a result, it is possible to suppress unevenness, omission, or the like among the processing of each optical head 20, to suppress a processing deviation in the processing and the image formation, and to perform good laser processing. Furthermore, since this can be achieved with one type of optical head 20, there is no need to carry an inventory and costs can be reduced.

Second Embodiment

Next, a laser processing apparatus of a second embodiment will be described. FIG. 6 is a descriptive diagram of the laser processing apparatus according to the second embodiment.

In the plurality of optical heads 20 of the laser processing apparatus 10 of the first embodiment, there is illustrated an example in which the array head 44 is arranged near the central portion in the Z-axis direction and near the central portion in the X-axis direction. Meanwhile, in a plurality of optical heads 21 of the laser processing apparatus 10 according to the present embodiment, while an array head 44 is arranged near a central portion in the Z-axis direction, the array head 44 is arranged disproportionately in the X-axis direction.

In the laser processing apparatus 10 of the second embodiment, as illustrated in FIG. 6, a plurality of optical heads 21 (21*a* to 21*d*) is provided. As in the first embodiment, a height H of the plurality of optical heads 21, which is a length in the Z-axis direction, is equal to or less than twice a length h of laser light emitted from the plurality of optical heads 21 in the Z-axis direction. That is, $H \leq 2h$.

The plurality of optical heads 21*a* to 21*d* includes a first optical head group including the optical head 21*a* and the optical head 21*c* that are optical heads arranged adjacent to each other in the Z-axis direction and a second optical head group including the optical head 21*b* and the optical head 21*d* that are optical heads arranged adjacent to each other in the Z-axis direction. As in the first embodiment, the first optical head group and the second optical head group are arranged adjacent to each other in the X-axis direction (conveying direction of a thermosensitive recording medium RL).

Furthermore, the first optical head group and the second optical head group are arranged while being shifted by a predetermined distance in the Z-axis direction, that is, lowered by the predetermined distance in the Z-axis direction. In the laser processing apparatus 10 according to the present embodiment, the predetermined interval is a length h of the laser light in the Z-axis direction. Therefore, similarly to the first embodiment, the first optical head group and the second optical head group are arranged so as to be shifted by the length h of the laser light in the Z-axis direction.

Furthermore, as illustrated in FIG. 6, in the optical heads 21 of the first optical head group of the second embodiment, the array head 44 is arranged near the central portion in the Z-axis direction and is arranged disproportionately toward a side near the second optical head group in the X-axis direction. Furthermore, in the optical heads 21 of the second optical head group, the array head 44 is arranged near the central portion in the Z-axis direction and is arranged disproportionately toward a side near the first optical head group in the X-axis direction. Furthermore, the optical heads 21 of the second optical head group may be arranged by vertically inverting the optical heads 21 of the first optical head group.

The plurality of optical heads 21*a* to 21*d* is arranged in order of the optical heads 21*a*, 21*b*, 21*c*, and 21*d* from above in the Z-axis direction illustrated in FIG. 6. Therefore, in other words, in a case where the plurality of optical heads 21*a* to 21*d* is counted in order from the top in the Z-axis direction, the odd-numbered optical heads 21*a* and 21*c* and the even-numbered optical heads 21*b* and 21*d* that are inverted odd-numbered optical heads are arranged in a stacked manner in a vertical direction that is the Z-axis direction. Then, the respective optical heads are arranged in contact with each other in the X-axis direction.

From the above, referring to the graph of FIG. 6, compared with the graphs of FIGS. 4 and 5, a distance between the laser light of the first optical head group (odd-numbered optical heads 21*a* and 21*c*) and the laser light of the second optical head group (even-numbered optical heads 21*b* and 21*d*) in the X-axis direction is further smaller. Thus, in the laser processing apparatus according to the present embodiment, it is possible to further narrow the distance between the laser light beams of the plurality of optical heads 21 in the X-axis direction. As a result, it is possible to suppress unevenness, omission, or the like between processing of the optical heads 21, to suppress a processing deviation in the processing and the image formation, and to perform good laser processing. Furthermore, since this can be achieved with one type of optical head 20, there is no need to carry an inventory and costs can be reduced.

(Verification Experiment)

Next, a verification experiment conducted by the present applicant will be described. Verification experiments were conducted on the comparative embodiment (FIG. 4), the first embodiment (FIG. 5), and the second embodiment (FIG. 6) using the laser processing apparatus 10 illustrated in FIG. 2.

Example 1

Herein, experiments were conducted using four optical heads that emit laser light at a width of 24.4 mm in the Z-axis direction (192 light sources at a pitch of 0.127 mm). This optical head has a size of 48 mm in height (Z-axis direction), 200 mm in width (X-axis direction), and 300 mm in depth (Y-axis direction) illustrated in FIG. 5. Furthermore, the optical head is irradiated with the laser light at a position of 100 mm in the width direction (X-axis direction) (that is, at the center position). Then, as illustrated in FIG. 5, the first and third optical heads from the top were arranged in a stacked manner to the left, and the second and fourth optical heads were arranged in a stacked manner to the left while being lowered by 24.4 mm. As a result, a left and right width of the laser light was 200 mm.

Next, using a laser processing apparatus of the present example, a thermosensitive recording medium RL that is laser-recordable (containing a photothermal conversion material) was moved at a conveying speed of 0.5 m/s, 2.0 m/s, 5.0 m/s, and a gray scale image was recorded by 30 m.

As an evaluation method, gaps and overlapping with each laser irradiation device were visually confirmed and the following judgment was made and described in a table.

A: No gap and no overlap

B: A gap and an overlap occurred within one dot

C: A gap and an overlap occurred in one dot or more

Example 2

Also herein, experiments were conducted using four optical heads that emit laser light at a width of 24.4 mm in the Z-axis direction (192 light sources at a pitch of 0.127 mm). This optical head has a size of 48 mm in height (Z-axis direction), 200 mm in width (X-axis direction), and 300 mm in depth (Y-axis direction) illustrated in FIG. 6. Furthermore, the optical head is irradiated with the laser light at a position of 20 mm from the optical head adjacent in the width direction (X-axis direction). Then, as illustrated in FIG. 6, the first and third optical heads from the top were stacked and arranged to the left, and the second and fourth optical heads that are optical heads obtained by vertically inverted the same type optical head as the first and third optical heads were arranged in a stacked manner to the right while being lowered by 24.4 mm. As a result, a left and right width of the laser light was 40 mm. For other than those above, the same evaluation as in Example 1 was conducted and results were described in the table 1.

Comparative Example

Herein, experiments were conducted using four optical heads that emit laser light at a width of 24.4 mm in the Z-axis direction (192 light sources at a pitch of 0.127 mm). This optical head has a size of 100 mm in height (Z-axis direction), 150 mm in width (X-axis direction), and 300 mm in depth (Y-axis direction) illustrated in FIG. 4. Furthermore, the optical head is irradiated with the laser light at a position of 75 mm in the width direction (X-axis direction) (that is, at the center position). Then, as illustrated in FIG. 4, the first to fourth optical heads were arranged side by side while being shifted by 24.4 mm in a height direction. The maximum width of the laser light was 450 mm. For other than those above, the same evaluation as in Example 1 was conducted and results were described in the table 1.

TABLE 1

| | Maximum width of laser light | Conveying speed of thermosensitive recording medium 0.5 m/s | 2.0 m/s | 5.0 m/s |
|---|---|---|---|---|
| Example 1 | 200 mm | A | A | B |
| Example 2 | 40 mm | A | A | A |
| Comparative example | 450 mm | A | B | C |

As illustrated in the above Table 1, in the laser processing apparatus of the present comparative example, when a "maximum width of laser light" so far becomes large, a gap and an overlap occur, and when a conveying speed of a thermosensitive recording medium RL increases, a problem occurs notably.

The above-described embodiment is illustrative and does not limit the present invention. Thus, numerous additional modifications and variations are possible in light of the above teachings. For example, at least one element of different illustrative and exemplary embodiment herein may be combined with each other or substituted for each other within the scope of this disclosure and appended claims. Further, features of components of the embodiment, such as the number, the position, and the shape are not limited the embodiment and thus may be preferably set. It is therefore to be understood that within the scope of the appended claims, the disclosure of the present invention may be practiced otherwise than as specifically described herein.

REFERENCE SIGNS LIST

10 Laser processing apparatus
14 Laser irradiation device
14*a* Laser array unit
14*b* Fiber array unit
20, 21, 200 Optical head
30 Body unit
41 Laser light emitting element
42 Optical fiber
42*a* Laser emitting unit
43 Optical unit
43*a* Collimator lens
43*b* Condenser lens
44 Array head
45 Drive driver
46 Controller
47 Image information output unit
48 Power source
50 Cooling unit
51 Heat receiving unit
52 Heat radiating unit
53*a*, 53*b* Cooling pipe
RL Thermosensitive recording medium

CITATION LIST

Patent Literature

[PTL 1] Japanese Laid-open Patent Publication No. 2010-52350

The invention claimed is:

1. A laser processing apparatus that irradiates an object to be subjected to the laser processing with laser light to perform laser processing, the laser processing apparatus comprising:

a plurality of optical heads, each including a laser head unit that emits a plurality of laser light beams in an arranged manner in a predetermined direction so that the object to be subjected to the laser processing, which is conveyed relatively with respect to the laser head unit in a conveying direction intersecting the predetermined direction, is irradiated with the emitted plurality of laser light beams, wherein the plurality of optical heads includes a first optical head group and a second optical head group, the optical heads are adjacent to each other in the predetermined direction, the first optical head group and the second optical head group are adjacent to each other in the conveying direction and shifted from each other by a predetermined length in the predetermined direction, and in each optical head of the first optical head group, the laser head unit is arranged, in the conveying direction, nearer the second optical head group than is a center of the optical head.

2. The laser processing apparatus according to claim 1, wherein a length of the plurality of optical heads in the predetermined direction is equal to or less than vice a length of the plurality of laser light beams in the predetermined direction.

3. The laser processing apparatus according to claim 1, wherein the predetermined length is a length of the plurality of laser light beams in the predetermined direction.

4. The laser processing apparatus according to claim 1, wherein in each of the plurality of optical heads, the laser head unit is arranged near a central portion in the predetermined direction and near a central portion in the conveying direction.

5. The laser processing apparatus according to claim 1, wherein the second optical head group is arranged by inverting vertically a same type of optical head group as the first optical head group.

6. The laser processing apparatus according to claim 1, further comprising a laser light emitting element that emits laser light, wherein the laser processing apparatus records a visible image on the object to be subjected to the laser processing by the laser processing by controlling emission of the laser light from the laser light emitting element.

7. The laser processing apparatus according to claim 1, wherein the predetermined direction is a direction orthogonal to the conveying direction.

8. The laser processing apparatus according to claim 1, wherein the plurality of optical heads each include an optical system that focuses the plurality of laser light beams emitted from the laser head unit on the object to be subjected to the laser processing.

* * * * *